Patented Feb. 27, 1934

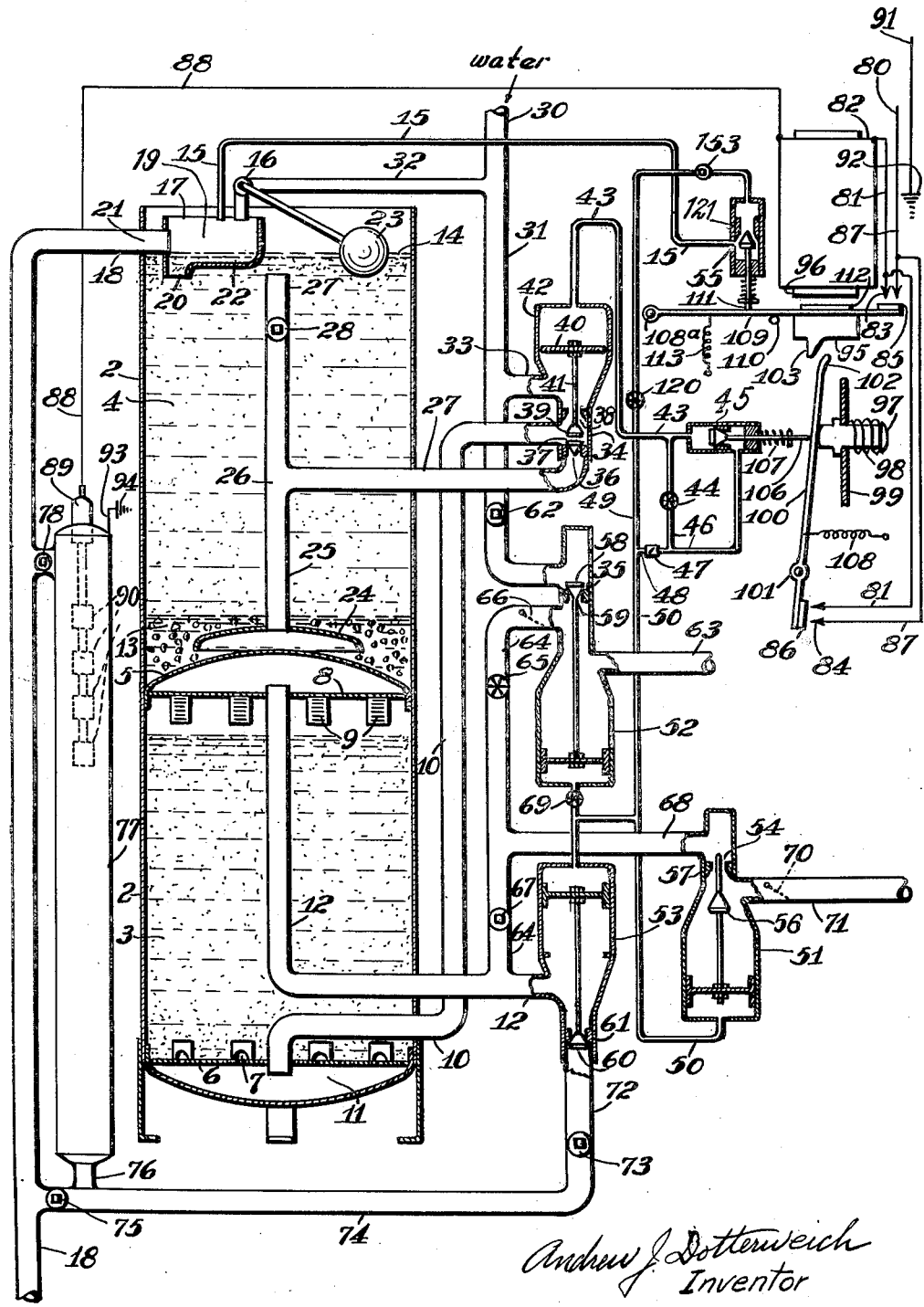

1,949,044

UNITED STATES PATENT OFFICE 1,949,044

WATER SOFTENING APPARATUS

Andrew J. Dotterweich, Pittsburgh, Pa., assignor to Automatic Water Softener Company, Pittsburgh, Pa., a corporation of Delaware Application August 26, 1929. Serial No. 388,300

29 Claims. (Cl. 210—24)

This invention relates to a complete water softening apparatus of the type employing a zeolite or similar material as a water softening agent which is adapted to be regenerated at intervals.

It is among the objects of this invention to provide an apparatus adapted to be self-regenerating after initiation of regeneration is effected by any suitable means as for example by the pressing of a push button.

Another object of this invention is to provide a water softening apparatus which is adapted to automatically by-pass a portion of untreated water to a single point of use during the complete cycle of regeneration and further adapted to supply softened water to two points of use during the period of softening.

Another object of this invention is to provide a water softening apparatus which is adapted to be either self-regenerative or regenerated by manual means.

Another object of this invention is to provide a water softening apparatus of the self-regenerating type which is of a simple and inexpensive construction, positive in operation, requiring a minimum area for floor space and adapted to operate at a high point of efficiency.

These and other objects of the invention will become more apparent from consideration of the accompanying drawing and specifications in which like reference characters designate like parts and in which the single figure is a sectional elevational view of a water softening system embodying the principles of this invention.

Referring to the drawing, the container 2 consists of a shell having a dividing partition 5 which divides the container into an upper salt tank and a lower tank for softening material.

Within the softener tank a bed of water softening material 3, of a desired depth rests on a supporting strainer plate 6 equipped with suitably spaced nozzles 7.

Leading from the source of supply, water and regenerating materials pass into the softener tank thru the piping 10 to the space 11 beneath the plate 6 and thence upwardly thru the strainer nozzles 7 and the zeolite 3 towards the upper end of the softener tank.

In the upper end of the softener tank, a plate 8 is equipped with suitably spaced strainer nozzles 9 which serve to assist in causing a uniform flow of fluids thru the zeolite bed towards this plate. The strainer nozzles 9 further serve to retain within the softener tank particles of water softening material which may be apt to pass from the softener at the higher rates of flow. The flow from the upper end of the softening tank is through pipe 12.

Within the salt tank, a charge of salt 4, sufficient for several regenerations, rests on a gravel bed 13. This charge of salt is in water whose upper level is maintained at 14 by a discharge pipe 18. This level 14 is maintained by the inflow of water thru either the pilot piping 15 or the float controlled valve 16 or by both.

At this upper level 14, provision is made by means of a cup-like device 17 to prevent the discharge of salt solution from the salt tank to the drain thru drain connection piping 18 at such times when a surplus of refill water may pass into the salt tank thru the pilot piping 15 as is hereinafter described.

This device 17 has an inlet opening or funnel at 19, a discharge connection 20 leading directly to the salt solution beneath it and another discharge connection 21, positioned somewhat above the bowl 22, leading to the drain thru piping 18.

During the period of regeneration, the withdrawal of regenerating fluid would lower this level 14, and therefore provision is made to maintain this level by utilizing the water used in the operation of the valves of the system by directing the flow of such water to the salt tank thru the piping 15, thence into the bowl 22 of the device 17, from which it passes thru opening 20 to replace the volume of salt solution being withdrawn.

In the smaller softeners, ordinarily the volume of water per minute required to operate the hydraulic valves, as hereinafter described, exceeds the rate of withdrawal of salt solution from the salt tank and accordingly the surplus of water passing into the device 17 in excess of the amount required to maintain the level 14, passes from the device 17 and salt tank thru the opening 21 to the drain thru piping 18.

In the larger softeners, the volume of water per minute required to operate the hydraulic valves of the system would ordinarily be less than the rate of withdrawal of salt solution from the salt tank and accordingly an auxiliary float controlled valve 16 is employed. This valve 16 is operated by a float 23 in a manner to permit the passage of water from a source of supply in sufficient volume to assist in maintaining the level 14.

The preferred operation of this equipment requires that the salt solution in the salt tank be maintained in a quiet state rather than to be agitated so that the concentrated salt solution will be at the bottom in the salt tank and that there will be little or no salt solution in the upper portion of the solution in the salt tank. In fact, if fresh water is permitted to pass into the salt tank so as not to disturb or agitate the solution in the salt tank, I have found a complete separation of the salt solution and fresh water at considerable depth below the level 14.

The device 17 serves to receive the force of water from the refill inlets in the bowl 22 where the kinetic energy of the inflowing water is dissipated so that the water passes quietly thru the opening 20 to the solution beneath.

This device also serves to reduce corrosion in the upper portion of the salt tank by maintaining fresh water at the level 14 and thus avoid the more corrosive and destructive effects of a salt solution.

Embedded in the gravel bed 13, a salt solution collector 24 has connection by piping 25 to a T at 26. At a point somewhere below the level 14, piping 27 serves as an inlet of fresh water for passage thru the choke 28 to the T at 26, piping 27 causes the flow of a partly concentrated salt solution from the salt tank to the valve 34.

The operation of this apparatus provides for shutting off the direct flow of water to the zeolite bed 3 during the period of salt application or regeneration and for the withdrawal of a salt solution by gravity or siphon action from the salt tank to regenerate the zeolite in its passage thru the zeolite to the drain.

I have found that most efficient regeneration of the zeolite bed 3 is accomplished by the use of a partly concentrated salt solution and accordingly as above described salt solution in concentrated form is withdrawn from the lower end of the salt tank while fresh water is withdrawn from the upper end of the salt tank, both of which meet at the T connection 26 in passage from the salt tank. For purpose of securing the proper concentration of salt solution for regeneration, provision is made by means of an adjustable choke nozzle 28 whereby a control is had over the relative amounts of each solution which shall pass from the salt tank thru piping 27.

This particular manner of salt application from a fixed head existing between the level 14 of the salt tank and the discharge at the drain by either the flow of gravity or siphon provides a means whereby a salt solution of desired concentration may be applied to a bed of zeolite at constant and proper rates of flow regardless of variable factors, which affect the efficiency of regeneration, as for example, a change in water pressure at the source of water supply, insufficient water pressure or volume affecting the rate of salt application by an injector.

Leading from a source of water supply at 30, water piping 31 has connection with the branch 32 leading to the float controlled valve 16, with branch 33 leading to the valve 34 controlling the incoming water and the discharge from the salt tank and with the valve 35 controlling the bypassing of water during the regeneration and flushing of the zeolite 3.

Valve 34 is a double acting valve which, in the lower position as illustrated, seals the salt solution port at 36 by the member 37 thru the force of gravity and the internal pressure within the system and when in the upper position seals the hard water inlet port at 38 by the member 39 thru the pull of the piston 40 which is attached to members 37 and 39 by a stem 41.

The piston 40 is loosely fitting in cylinder 42 which permits the passage of a restricted quantity of water around it in such a manner that when the internal pressure within the system is released at the upper side of the piston, as by the opening of a valve in the discharge line 43 leading from the cylinder 42, the piston will be moved upwardly by the pressure communicated thru the connection 33, and pull stem 41 upwardly, thereby opening the port at 36 and seating the member 39 against the port 38. Upon closing the valve in the line 43, water will pass around the piston 40 and the pressure will become equalized on both sides of the piston 40. Thereupon the piston 40 will drop by force of gravity, valve 39 will open and 37 will close.

The pilot or discharge piping 43 leads to a hand operated valve 44 for use at times when the apparatus is manually regenerated and to a mechanically operated valve 45 used when the apparatus is self regenerative.

Leading from the valves 44 and 45, the pilot or discharge piping 46 has connection thru the check valve 47 with the piping 48 where a dual connection is made with a piping 49 leading thru hand operated valve 120, choke 153, mechanically operated valve 121, discharge connection 55 and piping 15 to the discharge into the salt tank, and with piping 50 leading to the cylinders 51, 52 and 53 of the soft water control valve 54, bypass control valve 35 and drain control valve 61 respectively.

In the piping 49, the hand operated valve 120 serves to control the apparatus at times when it is being manually regenerated while the alternatively and mechanically operated valve 121 is in use at such times when the apparatus is self regenerative.

Disposed in the piping 49, a choke 153 serves to control the discharge from the valves 44 or 45 for securing back pressure in the piping 49, 50, 48 and 46 for purpose of operating the pressure and water-tight pistons in the cylinders 51, 52 and 53 in the following manner.

Assuming the valve 44 as being open and valve 45 closed water from the source of supply at 30 passes thru piping 31, connection 33 and upwardly thru the cylinder 42, thence around the piston 40 (causing the port 38 to be closed and the port 36 to be opened) thence at a reduced pressure thru piping 43 open valve 44, piping 46, check valve 47, piping 48, piping 49, open valve 120, choke 153, thence at a further reduced pressure thru the open valve 121, discharge opening 55, piping 15 to the salt tank.

During the period when water is passing to the salt tank, a back pressure, caused by the choke 153, acts on the piston of the valve 54 causing the member 56 to close the soft water port at 57, on the piston of the valve 35 causing the member 58 to be unseated from the hard water by-pass port at 59 and on the piston of the valve 61 causing the member 60 to open the drain port of this valve.

Upon termination of the salting period, valve 120 (or 121) is closed and then valve 44 is closed. The closing of valve 120 causes water to be trapped within the piping 46, 48, 49 and 50 and in the cylinders 51, 52 and 53 to position the pistons in these cylinders together with the valves 54, 35 and 61 for the flushing period.

The closing of the open valve 44 allows the pressure on both sides of the piston 40 of the valve 34 to become equalized and accordingly by reason of gravity, the port 38 is opened and the port 36 closed, permitting water from the source of supply to pass thru piping 31, connection 33, port 38 and thence to the zeolite thru the piping 10.

Upon completion of the flushing operation, both valves 120 and 121 are opened and the trapped pressure within the piping and cylinders, as above recited, is released to atmospheric pressure to permit the pressure within the system to act on the opposite sides of the pistons in the cylinders 51, 52 and 53 so that the soft water port at 57 of valve 54 is opened, the hard water port 59 of valve 35 is closed and the drain port of valve 61 is closed.

At the time initiation of regeneration is effected by the opening of either of valves 44 or 45, the pressure within the system would ordinarily be equal to the pressure at the source of supply, and therefore by the closing of port 38 and the opening of port 36, the trapped pressure within the softener tank is relieved thru the pipe 10 and thence thru the port 36 to the salt tank, leaving the pressure within the softener tank sufficiently low during the cycle of regeneration so that a back pressure caused by the choke 153 will render the valves operative.

During the periods of regenerating and washing the zeolite 3, water from the source of supply at 30 passes thru piping 31, choke 62, port 59 of valve 35 and thence to a point of use thru piping 63 at a desired rate of flow controlled by the choke 62.

Leading from the softener tank, piping 12 has connection with the valve 61 controlling the discharge to the drain, with piping 64 to the hard water by-pass valve 35 and with piping 64 and 68 to soft water valve 54 to a point of use thru piping 71.

Disposed in the piping 64, a choke 67 serves to control the rate of soft water discharge to within desired limits. The check valve 66, serves to prevent a flow of hard water from piping 31 to the drain thru piping 64, connection 12 and port 61 during the regeneration cycle. If desired, by-pass valve 35 can be rendered inoperative by the closing of the hand valve 69 in the pilot piping 50 leading to the cylinder 52 of valve 35 thus preventing the application of operating pressure to the piston of the valve 52. Incidently, the hand valve 65 should also be closed when the by-pass is operative for reason of preventing the flow of regenerating fluids from passing to the point of use at 63 thru the piping 64.

In an installation where the softened water is directed to an elevation of some height, a back pressure may exist in the soft water line exceeding the operating pressure actuating the pistons of valves 54, 35 and 61 rendering them inoperative as well as causing a back flow of water during the salting period thru piping 71, valve 54, piping 68, 64 and 12 thence downwardly thru the zeolite 3, strainer nozzles 7, thence from the softener thru piping 10, port 36, of valve 34, piping 27 to the salt tank and thence from the salt tank thru the opening 21 of the device 17. To overcome such difficulties a check valve 70 is inserted in the soft water line 71.

Under conditions where the pressure in the soft water line is less than the operating pressure actuating the pistons of valves 54, 35 and 61, the check valve 70 is not required as the valve 54 provides for closing the port 57 under these conditions.

Leading from the drain valve 61, the flow of water is directed thru piping 72, choke 73, piping 74, thence thru a divided path, one path leading thru the choke 75 to a drain by piping 18, the other path leading thru connection 76 to a receiving or electrode tank 77, thence from the tank 77 thru the choke 78 to the drain also thru piping 18.

The operation of this apparatus involves means for controlling the rate of flow of water passing thru the zeolite bed for purpose of efficient operation and accordingly a choke 67 in the soft water line 64 serves to control such flow during the period of softening while the flow is controlled by a choke 73 placed in the drain line 72—74 during the periods of regeneration and flushout.

The operation of this apparatus further requires a means for controlling the volume of regenerating material and wash water passing to the softening material.

For the purpose of controlling the volume of regenerating fluid, the choke 75 is set to a fixed position whereby after a sufficient quantity of fluid has passed into the electrode tank 77 the fluid will co-act with the electrode 90, as hereinafter explained, to terminate the flow of regenerating fluid. An increased opening of the choke 75 results in the passage of a greater volume of regenerating fluid whereas a decreased opening of the choke 75 reduces the volume of regenerating fluid to the zeolite bed 3.

For purpose of controlling the volume of flushout or wash water, with the choke 75 positioned as during the salting period, the choke 78 is set to a fixed position whereby after the passage of a sufficient quantity of fluid thru the electrode tank 77, such fluid will co-act with the electrodes 90, hereinafter explained, to terminate the flow of such flushout water. An increased opening of the choke 78 causing a decreased volume of wash water whereas a decreased opening of the choke 78 results in an increased volume of wash water.

The operation of this apparatus, except when operated manually, provides for the use of the relative electrical conductivity of the fluids flowing to the drain as a means for controlling the volume of regenerating fluid passing to the zeolite 3, the initiation of the flow of water to flush out the regenerating fluid, the volume of wash water required, termination of the flow of by-pass water and the placing of the softener in position to deliver softened water to use.

For conducting the operation recited in the preceding paragraph, a magnet or solenoid 82 is employed which has connection by one terminal thru wire 81, contact fingers 83 and 84, contact plates 85 and 86, wire 87 to a suitable source of electrical energy at 80. The other terminal of the magnet or solenoid 82 is connected by wire 88 thru an electrically insulated bushing 89 to electrodes 90 within the electrode or receiving tank 77. The other terminal 91 of the source of electrical energy is commonly grounded as indicated at 92 and therefore completes the circuit embracing the magnet 82, electrodes 90 wiring 88 etc., when the apparatus is operative. A grounded connection with the apparatus is made at some suitable location such as suggested by the wire 93 at 94.

As recited in previous applications for Letters Patent, Serial #687,340 filed Jan. 19, 1924 and Serial #724,804 filed July 8, 1924, the electrical conductivity of a fluid varies in accordance with the change in its character, that is, if a water is salty or briny, the fluid is a good conductor of electricity whereas if the water is substantially free of solids in solution, the water or fluid is a poor conductor of electricity. This difference in conductivity forms the basis for automatic operation of regeneration of this apparatus after the initiation of regeneration has been accomplished manually.

Accordingly when a briney water forms a contact between the electrodes 90 and the tank 77, with a completed circuit, the magnet 82 is sufficiently energized to hold the armature 95 in contact with the core 96 at such times when a fluid substantially free of solids passes between the electrodes 90 and the tank 77, the current through the magnet is of insufficient strength to attract or hold the armature 95 to the core 96.

Referring to the means for initiating the regeneration cycle, a push button member 97 retained in inoperative position by spring 98 set against a backing 99 serves when depressed against spring 98, to set the lever 100 in operating positon. This lever 100 is pivoted at 101, has on one end a suitably insulated contact plate 86 and on the other end a latch 102 which when the button 97 is depressed, passes under a heel 103 attached to the armature 95, lifting the armature a bit in doing so. Upon release of pressure on the button 97, the spring 98 returns the button to its inoperative position leaving the latch 102 caught on the heel 103 by the return of the armature 95 to its lower position. Further actions of the button 97 and the lever 100 in the above operation are the opening the valve 45 by the stem 106 in mechanical contact with the lever 100 against the spring 107, thus maintaining this valve 45 open and cause the contact plate 86 to make electrical connection with the contact fingers 84 as long as the latch 102 is held by the heel 103. A spring 108 serves to draw the lever 100 towards the button 97 after the lever 100 has been released by the latch 102 passing from the heel 103.

Pivoted at 108ª, a lever arm, 109, resting in its lower position against the stop 110, has attached to it the armature 95 together with suitably insulated contact plate 85.

At times when the magnet 82 is energized, the armature 95 is drawn to the core 96 causing the contact plate 85 to close an electric circuit with the contact fingers 83 as well as to close the valve 121 thru a mechanical connection by the stem 111 with the lever arm 109 whereby the valves 54, 35 and 61 are maintained in a position to cause flushing of the zeolite bed 3.

The armature 95 is preferably provided with a suitable means 112 such as a thin strip of fibre serving to prevent a magnetic contact of the armature 95 with the core 96 to permit the easy release by gravity aided by action or the spring 113, of the armature 95 at such times when a minimum current is passing thru the windings of the magnet 82 which occurs upon completion of the washing or flushing operation. This spring 113 may be adjustable for tension, in such a manner that with a predetermined minimum amount of electrical current flowing in the winding of magnet 82, the weight of the armature 95 together with the pull of the spring 113 will draw the armature from the core 96 and incidently open the port in the valve 54 to terminate the washing operation.

The electrical circuit provides for a parallel connection of contact plate 85 and contact fingers 83 with contact plate 86 and contact fingers 84 in such a manner that an electrical circuit is constantly maintained by these plates and contact fingers during the entire period of the regeneration cycle and upon completion of the regeneration cycle, a complete electrical disconnection of the apparatus from the source of electrical energy is effected.

The complete disconnection of electrical energy from the apparatus is not essential for the operation thereof but is preferred for reason of safety.

In the instance where it is immaterial if the electrical energy is connected at all times, the contact plates 85 and 86 and contact fingers 83 and 84 can be dispensed with and then the electrical circuit is from the source at 80 direct with one terminal of the magnet 82 and from the other terminal of the magnet 82 thru wire 88, bushing 89 to the electrodes 90.

In as much as the electrode tank 77 is empty at all times except during the regeneration cycle, the circuit is broken by the air gap between the electrodes 90 and the tank 77 and thus there will be no electrical current flowing in the energizing circuit.

To initiate the regeneration, pressing of the button 97 causes a contact to be made by contact plate 86 with contact fingers 84 which places the magnet 82 in electrical connection with the source of electrical energy at 80.

The appearance of a fluid of sufficient conductivity at the electrodes 90 renders the magnet 82 operative so as to draw the armature 95 towards the core, first making a parallel electrical connection through plate 85 and the contact fingers 83 and then releasing the latch 102 of lever arm 100 rendering the circuit broken at the contact plate 86 but maintained complete at the contact plate 85. The appearance of a fluid at electrodes 90 of poor electrical conductivity renders the magnet 82 inoperative which permits the armature 95 to pass from the core and incidently break the electrical circuit at contact plate 85.

The apparatus being adapted for either self regenerative or manual operation, description of the automatic operation is here given followed by description of the manual operation in subsequent paragraphs.

The use of hand operated valves 44 and 120 is not required in the automatic operation of this apparatus and accordingly valve 44 is placed in a closed position and valve 120 in an open position.

Assuming that the zeolite 3 has become exhausted, the operator presses the button 97 momentarily, causing the latch 102 to catch on the heel 103, completing an electrical circuit by contact plate 86 and opening the valve 45.

The valve 121 being normally open, water from the source at 30 passes thru piping 31, connection 33, thence around the piston 40 (drawing the member 37 from its port 36 and closing port 38 by the member 39) thence thru pilot piping 43, open valve 45, thence thru pilot piping 46, check valve 47, piping 48, piping 49, open valve 120, choke 53, open valve 121 and thence thru piping 15 to the salt tank. A restriction to flow by choke 53 causes a back pressure on the piping 50 which pressure acts against the pistons of valves 54, 35 and 61 causing the soft water valve 54 to close, the by-pass valve 35 to open and the drain valve 61 to open.

The by-pass valve being open, a flow of untreated water passes from the source at 30 thru piping 31, choke 62, valve 35 to point of use at 63.

The salt port 36 being open, a flow of salt solution passes by gravity or siphon action into piping 10 to the chamber 11, thence upwardly thru the strainer nozzles 7, zeolite bed 3, strainer nozzles 9, thence from the softener thru piping 12, drain valve 61, piping 72, choke 73, piping 74, thence taking a divided path, one path leading to the drain thru the choke 75 and the piping 18, the other path leading upwardly thru the electrode tank 77, thence to the drain thru the choke 78 and piping 18.

While the salt solution is passing from the salt tank, the inflow of water thru piping 15 and float controlled valve 16 maintains the level 14 of the salt tank.

After sufficient regenerating solution has passed to the zeolite bed 3, a briney solution passes up thru the electrode tank 77, the electrical conductivity of the solution becoming sufficiently high to cause the magnet 82 to draw the armature 95 to the core 96, closing the valve 121, releasing the latch 102 from the heel 103, causing the circuit to be broken at plate 86 and established at plate 85 and further causing the valve 45 to be closed by internal pressure and the spring 107.

Closing of the valve 45 causes pressure on both sides of the piston 40 to become balanced and accordingly the port 38 is opened and the port 36 closed by piston 40, stem 41, and members 37 and 39 dropping by gravity to lowered positions.

The closing of the valve 121 traps water in the pilot piping 46, 48, 49 and 50 as well as in the cylinders of valves 54, 35 and 61, maintaining them in the same positions as during the salting period.

The flow of flushing or washing water is now from the source of supply at 30, thru piping 31, connection 33, port 38 of valve 34, piping 10 to the chamber 11, thence upwardly thru the strainer nozzles 7, zeolite bed 3, strainer nozzles 9, then from the softener tank thru piping 12, drain valve 61, piping 72, choke 73, piping 74, thence by divided paths to the drain, one path leading thru choke 75 to drain piping 18 and the other path by connection 76 to and thru the electrode tank 77, then thru the choke 78 to the drain by piping 18.

During the flushing or washing operation, water from the source of supply at 30 passes thru the zeolite and continues until the conductivity of the fluid within the electrode tank renders the magnet 82 inoperative, causing the armature 95 to pass from the core 96, breaking the electrical contacts at the contact plate 85 and causing the valve 121 to open.

In connection with the termination of regeneration by the process of gradually eliminating the briney water from the softener, at the time such briney water is fully washed from the zeolite, there is retained within the electrode tank 77 sufficient briney wash water to maintain the flushing operation and as the brine free soft water passes into the electrode tank 77, there is a gradual elimination of all briney water from the electrode tank 77 with the resultant termination of regeneration.

The opening of valve 121 relieves the pressure acting on one side of the pistons of valves 54, 35 and 61 rendering the internal pressure active on the other side of the pistons to move them from the positions maintained during regeneration to the alternate positions maintained during the softening period, closing the drain and by-pass valves 61 and 35 and opening the soft water valve 54. Water in the tank 77 then empties thru connection 76, choke 75 and piping 18 to the drain.

During the water softening period, the flow of water is from the source of supply at 30 thru piping 31, connection 33, port 38 of valve 34, piping 10 to the space 11 within the container, thence upwardly thru the strainer nozzles 7, zeolite bed 3, strainer nozzles 9, thence from the softener tank thru piping 12, piping 64, choke 67, then taking divided paths, one path leading thru the valve 65, check 66, the casing of valve 35 and piping 63 to a point of use where it is essential to have a flow of water at all times, regardless of its character, as for example, a steam boiler, the other path leading thru the piping 68, port 57 of valve 54, check valve 70 and piping 71 to a point of use where it is essential to have a supply of water, uniform in character but not necessarily a continuous flow, as for example, the soft water storage tank in a laundry.

The manual operation of this apparatus provides for directing the flow of water thru the larger or passage controlling valves 34, 54, 35 and 61 by operating the pilot valves 120 and 44 in a manner to effect complete regeneration and within the control and judgment of the operator.

Valves 121 and 45 are not required in the manual operation, are positioned open and closed respectively and accordingly no reference will be made to them in the following description.

Assuming the zeolite 3 has become exhausted, initiation of the salting period is effected by opening pilot valve 44, valve 120 being open, the flow of fluids to and from the apparatus being identical with the flow of such fluids during the period of salting as described in the automatic operation with exception that the open valve 44 forms a by-pass around the closed valve 45.

After a sufficient charge of salt solution has passed into the softener tank, the pilot valve 120 is first closed and then valve 44 is next closed, causing the trapping of water within the control system, permitting the flow of fluids to and from the apparatus as described in the automatic operation for the flushout period, valve 120 performing the function of valve 121.

Upon completion of the flushing operation, the valve 120 is opened, relieving the trapped water in the control system and permitting the valves 120 to reset themselves for the softening period.

By describing and illustrating herein what I consider to be the preferred embodiment of apparatus suitable for practicing the invention, I do not thereby suggest or intend that the invention is limited in its application, or that the solicited claims are to be narrowed in their interpretation to any details not specifically referred to therein, for it is reasonably expected that those skilled in the art, may by advantage of the principles involved in this disclosure of apparatus, use methods of procedure perhaps dissimilar in appearance and arrangement but nevertheless within the scope of the invention and therefore desire to comprehend within my invention such modifications as may be necessary to adapt it to varying conditions and uses.

I claim herein as my invention:

1. In a water softener having a flow controlling system for normally flowing water to be softened through the softener to a service pipe and for flowing regenerating solution and water successively through the softener to a drain for regenerating and flushing operations respectively, valves in said system, an electromagnet, an energizing circuit therefor, an electrode in the drain controlling said circuit, and hydrostatic means controlled by said magnet to close a valve controlling the admission of regenerating solution to the softener and to retain open a valve controlling flow from the softener to the drain.

2. In a water softener having a flow-controlling system for normally flowing water to be softened through the softener to a service pipe and for flowing regenerating solution and water successively through the softener to a drain for regenerating and flushing operations respectively, valves in said system, an electromagnet, an energizing circuit therefor, an electrode in the drain controlling said circuit, and means controlled by said magnet to close a valve controlling flow of regenerating solution to the softener and open a valve controlling flow of water to the softener and to retain open a valve controlling flow from the softener to the drain.

3. In a water softener having a flow controlling system for normally flowing water to be softened through the softener to a service pipe and for flowing regenerating solution and water successively through the softener to a drain for regenerating and flushing operations respectively, valves in said system, an electromagnet, an energizing circuit therefor, an electrode in the drain controlling said circuit, and means controlled by the magnet for closing a valve controlling flow from the source of regenerating material and opening a valve controlling flow from the source of water and closing a valve controlling flow to the drain.

4. In a water softener having a flow controlling system for normally flowing water to be softened through the softener to a service pipe and for flowing regenerating solution and water successively through the softener to a drain for regenerating and flushing operations respectively valves in said system, an electromagnet, an energizing circuit therefor, an electrode in the drain controlling said circuit, and means controlled by said magnet for closing a valve controlling flow from the supply of regenerating solution and opening a valve controlling flow from the source of water and retaining open a valve controlling the flow to the drain and retaining closed a valve controlling the flow to the service pipe.

5. In a water softener having a flow-controlling system for normally flowing water to be softened through the softener to a service pipe and for flowing regenerating solution and water successively through the softener to a drain for regenerating and flushing operations respectively, valves in said system, an electromagnet, an energizing circuit therefor, an electrode in the drain controlling said circuit, and means controlled by said magnet for closing a valve controlling flow from the supply of regenerating solution and opening a valve controlling flow from the source of water and opening a valve controlling flow from the softener to the service pipe.

6. In a water softener having a flow controlling system for normally flowing water to be softened through the softener to a service pipe and for flowing regenerating solution and water successively through the softener to a drain for regenerating and flushing operations respectively, valves in said system, an electromagnet, an energizing circuit therefor, an electrode in the drain controlling said circuit, and means controlled by said magnet for closing a valve controlling flow from the supply of regenerating solution and opening a valve controlling flow from the source of water and retaining open a valve for by-passing water to the service line and retaining open a valve controlling flow from the softener to the drain.

7. In a water softener having a flow controlling system for normally flowing water to be softened through the softener to a service pipe and for flowing regenerating solution and water successively through the softener to a drain for regenerating and flushing operations respectively, valve in said system, an electromagnet, an energizing circuit therefor, an electrode in the drain controlling said circuit, and means controlled by said magnet whereby a valve controlling flow from the supply of regenerating solution is closed and a valve controlling flow from the source of water is opened and a valve controlling flow from said source to the service pipe is retained open and a valve controlling flow from the softener to the service pipe is retained closed while a valve controlling flow from the softener to the drain is retained open.

8. In a water softener having a flow controlling system for normally flowing water to be softened through the softener to a service pipe and for flowing regenerating solution and water successively through the softener to a drain for regenerating and flushing operations respectively, valves in said system, an electromagnet, an energizing circuit therefor, an electrode in the drain controlling said circuit, and means controlled by said magnet whereby a valve controlling flow from the supply of regenerating solution is retained closed and a valve controlling flow from the source of water is retained open and a valve controlling flow from said source to the service line is closed and a valve controlling flow from the softener to the drain is closed and a valve controlling flow from the softener to the service line is opened.

9. In a water softener having a flow controlling system for normally flowing water to be softened through the softener to a service pipe and for flowing regenerating solution and water successively through the softener to a drain for regenerating and flushing operations respectively, valves in said system, an electromagnet, an energizing circuit therefor, an electrode in the drain controlling said circuit, and hydrostatic means controlled by said magnet to hold the valves in regenerating position during the regenerating period and to set the valves for flushing at the termination of said period.

10. In a water softener having a flow controlling system for normally flowing water to be softened through the softener to a service pipe and for flowing regenerating solution and water successively through the softener to a drain for regenerating and flushing operations respectively, valves in said system, an electromagnet, an energizing circuit therefor, an electrode in the drain controlling said circuit, and hydrostatic valve-operating means controlled by said magnet to change the valves from position for regeneration to position for flushing and retain them in the latter position during the flushing period and then to set the valves for softening operation.

11. In a water softener having a flow controlling system for normally flowing water to be softened through the softener to a service pipe and for flowing regenerating solution and water successively through the softener to a drain for regenerating and flushing operations respectively, valves in said system, an electromagnet, an energizing circuit therefor, an electrode in the drain controlling said circuit, the control of said magnet determining the periods for setting the valves to terminate regeneration and flushing respectively, and hydrostatic valve-operating means controlled by said magnet for setting the valves for flushing at the termination of the regenerating period and for setting the valves for softening operation at the termination of the flushing period.

12. In a water softener having a normally open valve for controlling the flow of water thereto, a normally closed valve for controlling the flow of brine to the softener, a normally open valve for controlling the delivery of softened water to a service pipe, and a normally closed valve for controlling discharge from the softener to a drain, the combination with said valves and controlling means therefor operable to set the valves for flowing brine through the softener to a drain, of an electromagnet controlled by the drain effluent and controlling the said means to open the water supply valve and close the brine valve and retain them so while also retaining the service valve closed and the drain valve open for a period of flushing, and then to close the drain valve and open the service valve for restoring the softener to normal softening operation.

13. In a water softener having connections for supplying water and brine thereto and service and drain delivery connections, a normally closed brine valve, a normally open service valve and normally closed drain valve, hydrostatic valve controlling means operable to open the brine valve and drain valve and close the service valve, and an electromagnet controlled by the drain effluent and controlling the said hydrostatic means to close the brine valve and retain the drain and service valves respectively open and closed for a flushing operation.

14. In a water softener having connections for supplying water and brine thereto and service and drain delivery connections, a normally closed brine valve, a normally open service valve and normally closed drain valve, hydrostatic valve controlling means operable to open the brine valve and drain valve and close the service valve, and an electromagnet controlled by the drain effluent and controlling the said hydrostatic means to close the brine valve and retain the drain and service valves respectively open and closed for a flushing operation and then to close the drain valve and open the service valve.

15. In a water softener having connections for supplying water and brine thereto and service and drain delivery connections, a normally closed brine valve, a normally open service valve and normally closed drain valve, a normally closed by-pass valve and a connection controlled thereby for by-passing water from the supply line to the service line, valve controlling means operable to open the brine and drain and by-pass valves and close the service valve, and an electromagnet controlled by the drain effluent and controlling said means to close the brine valve after a determined regenerating period and to retain said other valves set as last mentioned for a suitable period for flushing and then to close the drain and by-pass valves and open the service valve.

16. In a water softener having means for flowing brine and water successively through the softener to a drain for regeneration and flushing, an electromagnet having a circuit controlled by the effluent discharged to the drain to energize said magnet effectively during discharge of a briney effluent and to cease effective energization during discharge of a fresh water effluent, and hydrostatically operated valves controlled by said magnet to stop the flow of brine to the softener when the magnet becomes effectively energized and to terminate the flushing operation when the magnet loses its effective energization.

17. In a water softener having water supply and brine supply connections and service and drain delivery connections, a normally closed brine valve, valve means normally maintaining open the service connection and maintaining closed the drain connection, the said brine valve and valve means being operable to establish a flow of brine through the softener to the drain with the service connection closed, an electromagnet having a circuit controlled by the effluent discharged to the drain to energize said magnet effectively during the discharge of a briney effluent and to cease effective energization during discharge of a fresh water effluent, and hydrostatic means for effecting the successive valve operations for regenerating and flushing and resumption of softening operation, said hydrostatic means being controlled by the magnet to close the brine valve when the magnet becomes energized and to maintain the said valve means in position to keep the drain connection open and the service connection closed until the magnet ceases to be effectively energized and then to restore said valve means to normal position.

18. In a water softener having a flow controlling system for normally flowing water through the softener to a service connection and for flowing regenerating solution and water successively through the softener to a drain for regenerating and flushing operations respectively, means operable to initiate regeneration, a chamber in connection with the drain into which liquid discharged to the drain rises, exposed means in said chamber with which the liquid will contact when it rises to a certain level, and means controlled thereby to become operative when a salty liquid contacts with the said exposed means for terminating regeneration.

19. In an apparatus of the character described in claim 18, adjusting means to regulate the rate of flow of liquid into said chamber for varying the time required for the liquid to contact with said exposed means and thereby regulating the volume of flow of regenerating solution in the regenerating operation.

20. In a water softener having a flow controlling system for normally flowing water through the softener to a service connection and for flowing regenerating solution and water successively through the softener to a drain for regenerating and flushing operations respectively, valve means successively operable for effecting the respective flows for regeneration and flushing and resumption of softening operation, a chamber in connection with the drain into which the drain liquid rises, exposed means in said chamber with which the drain liquid will contact when it rises to a certain level, means controlled by said exposed means to become and remain active when and while salty liquid contacts with said exposed means and to become inactive when the contacting liquid becomes fresh water, and valve controlling means controlled by the last named means to control the respective periods for setting the valve means for flushing and regeneration and resumption of softening operation.

21. In an apparatus of the character described in claim 20, flow regulating means in connection with said chamber for varying the rate of flow thereto and therefrom for the purpose of regulating the respective volumes of regenerating solution and water which flow through the softener in the regenerating and flushing operations respectively.

22. An apparatus of the class described comprising, in combination, a water softener having means for regeneration and flushing, a starting device, and means controlled by and automatically operable in response to actuation of said starting device for operating the softener to regenerate and flush and resume normal softening operation, said automatically operable means including an electromagnet the circuit for energizing which is initially closed through means controlled by the starting device and is subsequently closed through means controlled by the armature of said magnet, said starting device and armature embodying a catch and detent coacting when the starting device is actuated, and said magnet when energized releasing the said catch to allow the re-setting of the starting device.

23. In a water softener, a softening tank having a normally open connection for supplying water thereto and a normally closed connection for supplying brine thereto and a normally open service connection for delivery of softened water and a normally closed drain connection, valve means controlling the water and brine supply connections, other valve means controlling said service and delivery connections, piston means connected with said first named valve means and normally subjected to an equalized hydrostatic pressure and responsive to a relief of pressure at one side to change the position of said valve means for closing the water supply connection and opening the brine supply connection, piston means connected with the second named valve means and normally exposed to hydrostatic pressure to hold said valve means in normal position and operable by a reverse application of hydrostatic pressure to change the position of said valve means for closing the service connection and opening the drain connection, a hydrostatic pressure piping system controlling the respective piston means, a normally closed controlling valve in said system operable to permit flow of liquid under pressure therethrough with resultant relief of the equalized hydrostatic pressure on the first mentioned piston means and a reverse application of hydrostatic pressure on the second mentioned piston means, whereby the respective valve means are set for regeneration, and a normally open controlling valve located in said system at a point more remote from the source of pressure than the first mentioned controlling valve and closeable to entrap pressure in said system whereby to restore the equalized pressure on the first mentioned piston means while maintaining said reversed application of pressure on the second named piston means, so that the first named valve means assumes normal position to open the water supply connection and close the brine connection while the second named valve means continues to maintain the service connection closed and the drain connection open to permit the flow of water through the softener to the drain for flushing, the said controlling valves when both are reset in their normal positions functioning respectively to prevent a flow of pressure fluid from the source through said system and to relieve the reversed pressure on the second mentioned piston means so that the second named valve means assumes normal position to open the service connection and close the drain connection.

24. In a water softening apparatus of the character described in claim 23, a construction in which the second named valve means includes means controlling a normally closed connection which is open during regeneration and flushing for by-passing water from the water supply line to the service line.

25. In a water softener having a flow controlling system for normally flowing water to be softened through the softener and for flowing regenerating solution and water successively through the softener otherwise than to its normal delivery connection for regenerating and flushing operations, respectively, valve means in said system, the valve means being normally set for softening operation, fluid-operated means for operating said valve means, a piping system in connection with a source of fluid under pressure for controlling said fluid-operated means, a normally closed valve in said piping system normally preventing the flow of fluid therethrough and operable to permit a flow of fluid therethrough with resultant setting of the valve means for regeneration, and a normally open valve located in said piping system further from the fluid source than said first mentioned valve and closeable to entrap fluid under pressure in said system with resultant setting of the valve means for flushing, the restoration of both of said valves to their respective normal positions causing the restoration of the said valve means to position for softening operation.

26. In a water softening apparatus of the character described in claim 25, a brine tank into which the fluid flowing through said piping system discharges for replenishing the tank with fluid.

27. In a water softening apparatus, a brine tank having brine withdrawing means comprising brine receiving passages respectively in communication with the most concentrated and least concentrated portions of the brine in said tank and having a common discharge passage.

28. In a water softening apparatus, a brine tank having brine withdrawing means comprising a submerged open-ended pipe having a lower end adjacent to the bottom of the tank and an upper end adjacent to but below the level of the liquid in said tank and having an intermediate connection with a discharge pipe.

29. In a water softening apparatus, a brine tank having a salt bed, means for supplying water to the tank and maintaining it at a constant level above the salt bed, and brine withdrawing means comprising passages for receiving brine from below the bed and water from the upper portion of the tank and a common discharge passage.

ANDREW J. DOTTERWEICH.